(12) United States Patent
Boek et al.

(10) Patent No.: US 12,084,373 B2
(45) Date of Patent: Sep. 10, 2024

(54) GLASS CARRIERS FOR FAN-OUT PACKAGING HAVING TARGET COEFFICIENTS OF THERMAL EXPANSION AND METHODS FOR MAKING THE SAME

(71) Applicant: CORNING INCORPORATED, Corning, NY (US)

(72) Inventors: Heather Debra Boek, Corning, NY (US); Timothy Michael Gross, Painted Post, NY (US); Jin Su Kim, Seoul (KR); Jesse Kohl, Horseheads, NY (US); Hung Cheng Lu, Ithaca, NY (US); Yu Xiao, Pittsford, NY (US); Liying Zhang, Painted Post, NY (US); Lu Zhang, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 216 days.

(21) Appl. No.: 17/435,539

(22) PCT Filed: Feb. 24, 2020

(86) PCT No.: PCT/US2020/019422
§ 371 (c)(1),
(2) Date: Sep. 1, 2021

(87) PCT Pub. No.: WO2020/180516
PCT Pub. Date: Sep. 10, 2020

(65) Prior Publication Data
US 2022/0144681 A1 May 12, 2022

Related U.S. Application Data

(60) Provisional application No. 62/815,129, filed on Mar. 7, 2019.

(51) Int. Cl.
*C03B 17/02* (2006.01)
*B32B 17/06* (2006.01)
(Continued)

(52) U.S. Cl.
CPC .............. *C03B 17/02* (2013.01); *B32B 17/06* (2013.01); *C03B 17/064* (2013.01); *C03C 3/091* (2013.01); *C03C 3/093* (2013.01); *B32B 2307/30* (2013.01)

(58) Field of Classification Search
None
See application file for complete search history.

(56) References Cited

U.S. PATENT DOCUMENTS

| | | | |
|---|---|---|---|
| 7,406,841 | B2 | 8/2008 | Mitra |
| 9,340,451 | B2 | 5/2016 | Boek et al. |

(Continued)

FOREIGN PATENT DOCUMENTS

| | | |
|---|---|---|
| CN | 104364213 A | 2/2015 |
| CN | 104379532 A | 2/2015 |

(Continued)

OTHER PUBLICATIONS

Texas Instruments, "Wavelength Transmittance Considerations for DLP® DMD window", DLPA031C May 2012—Revised Mar. 2014. (Year: 2014).*

(Continued)

*Primary Examiner* — Lisa L Herring
(74) *Attorney, Agent, or Firm* — Daniel J. Greenhalgh

(57) ABSTRACT

Methods for manufacturing glass articles having a target effective coefficient of thermal expansion $CTE_{Teff}$ averaged over a temperature range comprise selecting a glass core composition having an average core glass coefficient of thermal expansion $CTE_{core}$ that is greater than the target effective $CTE_{Teff}$ and a glass clad composition having an (Continued)

average clad glass coefficient of thermal expansion $CTE_{clad}$ that is less than the target effective $CTE_{Teff}$; and manufacturing a glass laminate comprising a glass core layer formed from the glass core composition and two or more glass cladding layers fused to the glass core layer, each of the two or more glass cladding layers formed from the glass clad composition such that a ratio of a thickness of the glass core layer to a total thickness of the two or more glass cladding layers is selected to produce the glass laminate having an effective coefficient of thermal expansion $CTE_{eff}$ that is within ±0.5 ppm/° C. of the target effective $CTE_{Teff}$.

14 Claims, 4 Drawing Sheets

(51) Int. Cl.
*C03B 17/06* (2006.01)
*C03C 3/091* (2006.01)
*C03C 3/093* (2006.01)

(56) References Cited

U.S. PATENT DOCUMENTS

| | | |
|---|---|---|
| 2009/0035406 A1 | 2/2009 | Cleary, Jr. et al. |
| 2015/0030827 A1 | 1/2015 | Gomez et al. |
| 2015/0037552 A1 | 2/2015 | Mauro |
| 2015/0210583 A1* | 7/2015 | Amosov ............ C03C 1/00 65/53 |
| 2017/0073266 A1 | 3/2017 | Amosov et al. |
| 2017/0121209 A1* | 5/2017 | Dannoux ............ C03C 21/002 |
| 2018/0162768 A1 | 6/2018 | Boek et al. |
| 2019/0030861 A1 | 1/2019 | Bellman et al. |
| 2019/0134944 A1 | 5/2019 | Dawson-Elli |

FOREIGN PATENT DOCUMENTS

| | | | | |
|---|---|---|---|---|
| CN | 107182210 A | 9/2017 | | |
| CN | 107922243 A | 4/2018 | | |
| CN | 109153231 A | 1/2019 | | |
| CN | 109305748 A | 2/2019 | | |
| WO | WO-2017079540 A1 * | 5/2017 | ............ | B32B 17/06 |
| WO | 2017/132837 A1 | 8/2017 | | |
| WO | WO-2017184414 A1 * | 10/2017 | ............ | C03B 17/02 |
| WO | WO-2017196800 A1 * | 11/2017 | ............ | B32B 17/06 |

OTHER PUBLICATIONS

Fang et al., "2017 Product Line Plan"—Substrate, PGS group, 2017, 66 pages.
International Search Report and Written Opinion of the International Searching Authority; PCT/US2020/019422; dated Jun. 8, 2020; 14 pages; European Patent Office.
John Hunt, "Fan Out Packaging—Technology Evolution", Professional Development Course, International Wafer Level Packaging Conference, San Jose, 2018, 88 pages.
Lau et al. "Warpage and Thermal Characterization of Fan-Out Wafer-Level Packaging", ECTC Proceedings, vol. 7, No. 10, 2017, 10 pages.
Lau, "Fan-out Wafer/Panel-Lavel Packaging for 3D IC Heterogeneous Integration", Professional Development Course, International Wafer Level Packagin Conference, San Jose, 2018, 92 pages.
Panel Level Packaging Status 2018, Yole Development, 2018, 310 pages.
Chinese Patent Application No. 202080019273.4, Office Action, dated Feb. 2, 2023, 17 pages (10 pages of English Translation and 7 pages of Original Copy); Chinese Patent Office.
Lau et al., "Design, material, process, and equipment of embedded fan-out wafer/panel-level packaging", Chip Scale Review, vol. 20, May/Jun. 2016, pp. 38-44.

* cited by examiner

GLASS CARRIERS FOR FAN-OUT PACKAGING HAVING TARGET COEFFICIENTS OF THERMAL EXPANSION AND METHODS FOR MAKING THE SAME

CROSS REFERENCE TO RELATED APPLICATION

This application claims the benefit of priority under 35 U.S.C. § 371 of International Application No. PCT/US2020/019422, filed on Feb. 24, 2020, which claims the benefit of priority under 35 U.S.C. § 119 of U.S. Provisional Application Ser. No. 62/815,129 filed on Mar. 7, 2019, the content of each of which is relied upon and incorporated herein by reference in its entirety.

FIELD

This disclosure relates to glass carriers for use as fan-out packaging having target coefficients of thermal expansion and methods for making the same.

TECHNICAL BACKGROUND

Glass articles are used in a variety of industries, including the semiconductor packaging industry. In the semiconductor packaging industry, chips are placed on carrier substrates (e.g., glass plates) for processing which may include thermo-mechanical and lithographic steps. However, processing techniques may vary amongst manufacturers, giving rise to different carrier requirements for different manufacturing techniques which, in turn, gives rise to difficulties in manufacturing a single carrier substrate design that meets all the requirements for different manufacturers.

Conventionally, metal carrier substrates have been used because of the increased mechanical reliability of metal as compared to glass. However, suitable metals are typically heavier than glass, lack UV transparency, struggle to meet tightening total thickness variation requirements, and lack the range of coefficients of thermal expansion (CTEs) required by the fan out process that can be achieved using glass.

Accordingly, a need exists for alternative glass carriers for use in semiconductor manufacturing and methods for making the same.

SUMMARY

According to a first aspect, a method for manufacturing a glass article having a target effective coefficient of thermal expansion $CTE_{Teff}$ averaged over a temperature range comprises selecting a glass core composition having an average core glass coefficient of thermal expansion $CTE_{core}$ over the temperature range that is greater than the target effective $CTE_{Teff}$ and a glass clad composition having an average clad glass coefficient of thermal expansion $CTE_{clad}$ over the temperature range that is less than the target effective $CTE_{Teff}$; and manufacturing a glass laminate comprising a glass core layer formed from the glass core composition and two or more glass cladding layers fused to the glass core layer, each of the two or more glass cladding layers formed from the glass clad composition such that a ratio of a thickness of the glass core layer to a total thickness of the two or more glass cladding layers is selected to produce the glass laminate having an effective coefficient of thermal expansion $CTE_{eff}$ over the temperature range that is within ±0.5 ppm/° C. of the target effective $CTE_{Teff}$.

According to a second aspect, a method includes the method of the first aspect, wherein each of the glass core layer and the two or more glass cladding layers comprises a Young's modulus of greater than 50 GPa.

According to a third aspect, a method includes the method of the first or second aspects, wherein the two or more glass cladding layers each have a residual compressive stress of greater than 80 MPa.

According to a fourth aspect, a method includes the method of any of the previous aspects, wherein the glass laminate has an optical transmission of greater than 60% over a range of wavelengths from 300 nm to 400 nm for a total substrate thickness of from 0.3 mm to 2 mm.

According to a fifth aspect, a method includes the method of any of the previous aspects, wherein the glass laminate has an optical transmission of greater than 20% over a range of wavelengths from 250 nm to 300 nm for a total substrate thickness of from 0.3 mm to 2 mm.

According to a sixth aspect, a method includes the method of any of the previous aspects, wherein the glass laminate has an effective coefficient of thermal expansion $CTE_{eff}$ over the temperature range that is within ±0.2 ppm/° C. of the target effective $CTE_{Teff}$.

According to a seventh aspect, a method includes the method of any of the previous aspects, wherein the glass laminate has an effective coefficient of thermal expansion $CTE_{eff}$ over the temperature range that is within ±0.1 ppm/° C. of the target effective $CTE_{Teff}$.

According to an eighth aspect, a method includes the method of any of the previous aspects, wherein the glass laminate has a stored tensile energy per area of less than 20 J/m².

According to a ninth aspect, a method includes the method of any of the previous aspects, wherein the glass laminate has a stored tensile energy per area of less than 15 J/m² and greater than 2 J/m².

According to a tenth aspect, a method for manufacturing a glass article having a target effective coefficient of thermal expansion $CTE_{Teff}$ averaged over a temperature range comprises manufacturing an initial glass laminate comprising a glass core layer formed from a glass core composition and two or more glass cladding layers fused to the glass core layer, each of the two or more glass cladding layers formed from a glass clad composition having a first ratio of a thickness of the glass core layer to a total thickness of the two or more glass cladding layers, wherein the glass core composition has an average core glass coefficient of thermal expansion $CTE_{core}$ over the temperature range, the glass clad composition has an average clad glass coefficient of thermal expansion $CTE_{clad}$ over the temperature range, and the initial glass laminate has an initial effective coefficient of thermal expansion $CTE_{Ieff}$; determining the target effective coefficient of thermal expansion $CTE_{Teff}$ averaged over the temperature range, wherein the target effective $CTE_{Teff}$ is within ±1 ppm/° C. of the initial effective $CTE_{Ieff}$; and manufacturing a modified glass laminate comprising a modified glass core layer formed from the glass core composition and two or more modified glass cladding layers fused to the modified glass core layer, each of the two or more modified glass cladding layers formed from the glass clad composition such that a ratio of a modified thickness of the modified glass core layer to a modified total thickness of the two or more modified glass cladding layers is selected to produce the modified glass laminate having an effective coefficient of thermal expansion $CTE_{eff}$ over the temperature range that is within ±0.5 ppm/° C. of the target effective $CTE_{Teff}$.

According to an eleventh aspect, a method includes the method of the tenth aspect, wherein each of the glass core layer and the two or more glass cladding layers in the initial glass laminate and each of the modified glass core layer and the two or more modified glass cladding layers in the modified glass laminate comprises a Young's modulus of greater than 50 GPa.

According to a twelfth aspect, a method includes the method of the tenth or eleventh aspects, wherein the two or more glass cladding layers in the initial glass laminate and the two or more modified glass cladding layers in the modified glass laminate each have a residual compressive stress of greater than 80 MPa.

According to a thirteenth aspect, a method includes the method of any of the tenth through twelfth aspects, wherein the modified glass laminate has an optical transmission of greater than 60% over a range of wavelengths from 300 nm to 400 nm for a total substrate thickness of from 0.3 mm to 2 mm.

According to a fourteenth aspect, a method includes the method of any of the tenth through thirteenth aspects, wherein the modified glass laminate has an optical transmission of greater than 20% over a range of wavelengths from 250 nm to 300 nm for a total substrate thickness of from 0.3 mm to 2 mm.

According to a fifteenth aspect, a method includes the method of any of the tenth through fourteenth aspects, wherein the modified glass laminate has an effective coefficient of thermal expansion $CTE_{eff}$ over the temperature range that is within ±0.2 ppm/° C. of the target effective $CTE_{Teff}$.

According to a sixteenth aspect, a method includes the method of any of the tenth through fifteenth aspects, wherein the modified glass laminate has an effective coefficient of thermal expansion $CTE_{eff}$ over the temperature range that is within ±0.1 ppm/° C. of the target effective $CTE_{Teff}$.

According to a seventeenth aspect, a method includes the method of any of the tenth through sixteenth aspects, wherein the modified glass laminate has a stored tensile energy per area of less than 20 $J/m^2$.

According to an eighteenth aspect, a method includes the method of any of the tenth through seventeenth aspects, wherein the modified glass laminate has a stored tensile energy per area of less than 15 $J/m^2$ and greater than 2 $J/m^2$.

According to a nineteenth aspect, a method includes the method of any of the tenth through eighteenth aspects, wherein the initial effective $CTE_{Ieff}$ is greater than the target $CTE_{Teff}$, and the ratio of the modified thickness of the modified glass core layer to the modified total thickness of the two or more modified glass cladding layers is less than the first ratio.

According to a twentieth aspect, a method includes the method of any of the tenth through eighteenth aspects, wherein the initial effective $CTE_{Ieff}$ is less than the target $CTE_{Teff}$, and the ratio of the modified thickness of the modified glass core layer to the modified total thickness of the two or more modified glass cladding layers is greater than the first ratio.

According to a twenty-first aspect, a glass article comprises a glass cladding layer fused to a glass core layer, wherein: the glass core layer comprises a core glass composition having an average core coefficient of thermal expansion ($CTE_{core}$); the glass cladding layer comprises a clad glass composition having an average clad coefficient of thermal expansion ($CTE_{clad}$) that is less than the $CTE_{core}$; an effective coefficient of thermal expansion $CTE_{eff}$ of the glass article is greater than or equal to 3 ppm/° C. and less than or equal to 12 ppm/° C.; and the glass article has an optical transmission of greater than 60% over a range of wavelengths from 300 nm to 400 nm for a total substrate thickness of from 0.3 mm to 2 mm.

According to a twenty-second aspect, a glass article includes the glass article of the twenty-first aspect, wherein the glass article has a total thickness variation of less than 10 μm over a width of greater than or equal to 450 mm and less than or equal to 1500 mm.

According to a twenty-third aspect, a glass article includes the glass article of the twenty-first or twenty-second aspects, wherein the glass article has an optical transmission of greater than 20% over a range of wavelengths from 250 nm to 300 nm for a total substrate thickness of from 0.3 mm to 2 mm.

According to a twenty-fourth aspect, a glass article includes the glass article of any of the twenty-first through twenty-third aspects, wherein each of the glass core layer and the glass cladding layer comprises a Young's modulus of greater than 50 GPa.

According to a twenty-fifth aspect, a glass article includes the glass article of any of the twenty-first through twenty-fourth aspects, wherein the glass cladding layer has a residual compressive stress of greater than 80 MPa.

According to a twenty-sixth aspect, a glass article includes the glass article of any of the twenty-first through twenty-fifth aspects, wherein the glass article has a stored tensile energy per area of less than 20 $J/m^2$.

According to a twenty-seventh aspect, a glass article includes the glass article of any of the twenty-first through twenty-sixth aspects, wherein the glass article has a stored tensile energy per area of less than 15 $J/m^2$ and greater than 2 $J/m^2$.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
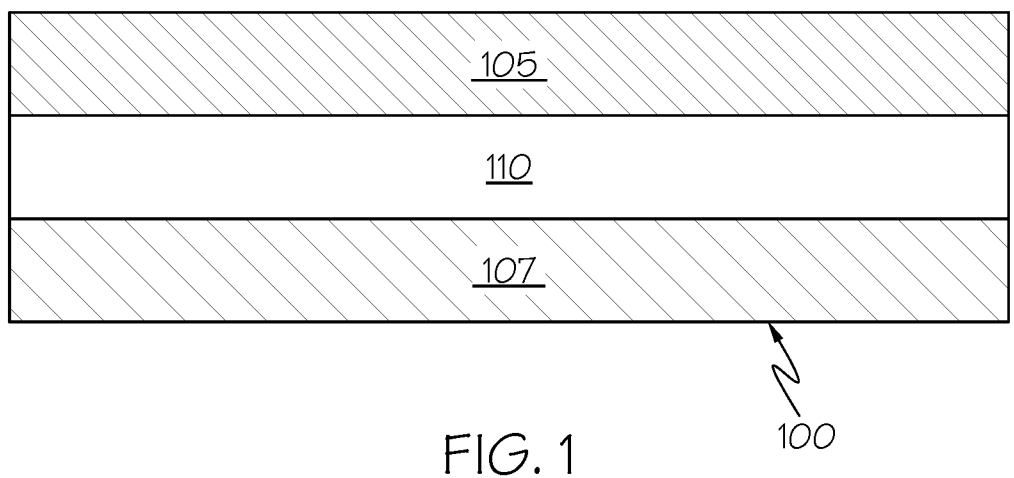
FIG. 1 is a cross-sectional schematic view of a glass substrate in accordance with one or more embodiments shown and described herein.

Reference will now be made in detail to various embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

In various embodiments, a method for manufacturing a glass article having a target coefficient of thermal expansion $CTE_{Teff}$ averaged over a temperature range includes selecting a glass core composition having an average core glass coefficient of thermal expansion $CTE_{core}$ over the temperature range that is greater than the target effective $CTE_{Teff}$ and a glass clad composition having an average clad glass coefficient of thermal expansion $CTE_{clad}$ over the temperature range that is less than the target effective $CTE_{Teff}$. The method further includes manufacturing a glass laminate comprising a glass core layer formed from the glass core composition and two or more glass cladding layers formed from the glass clad composition such that a ratio of a thickness of the glass core layer to a total thickness of the two or more glass cladding layers is selected to produce the glass laminate having an effective coefficient of thermal expansion $CTE_{eff}$ over the temperature range that is within ±0.5 ppm/° C. of the target effective $CTE_{Teff}$.

The term "coefficient of thermal expansion" or CTE is an average CTE over a particular range of temperatures. In various embodiments, the coefficient of thermal expansion of the glass composition is averaged over a temperature range from about 20° C. to about 300° C. In some embodiments, the coefficient of thermal expansion of the glass composition is averaged over a temperature range from about 20° C. to about 260° C.

In some embodiments, such as when the glass is flameworkable, the CTE may be measured over a temperature range of 0° C. to 300° C. via dilatometer. The glass is flameworked to a particular size with pointed tips. The sample is first immersed in a zero-degree ice bath, and then to a 300° C. bath, with the length of the sample being measured at each time. The CTE is then calculated based on the two measurements.

In other embodiments, such as when the glass is not flameworkable (e.g., glass laminates), the CTE may be measured over a temperature range of 20° C. to a maximum of 1000° C. via dilatometer. The glass is machined to a particular size with very flat ends and is placed in a small furnace which is heated up and cooled down with predetermined rate (for example, 4° C./min up, a 5 minute temperature hold, and 4° C./min down), and the temperature and the length of sample is measured real time. A thermal expansion curve during both heating and cooling can be obtained. The average CTE number over a certain temperature range can be obtained from this measurement from both the heating and cooling curve.

The elastic modulus (also referred to as Young's modulus) of the substrate is provided in units of gigapascals (GPa). The elastic modulus of the substrate is determined by resonant ultrasound spectroscopy on bulk samples of the substrate.

The term "softening point," as used herein, refers to the temperature at which the viscosity of the glass composition is $1 \times 10^{7.6}$ poise.

The term "annealing point," as used herein, refers to the temperature at which the viscosity of the glass composition is $1 \times 10^{13}$ poise.

The terms "strain point" and "$T_{strain}$" as used herein, refers to the temperature at which the viscosity of the glass composition is $3 \times 10^{14}$ poise.

As used herein, "transmission", "transmittance", "optical transmittance" and "total transmittance" are used interchangeably in the disclosure and refer to external transmission or transmittance, which takes absorption, scattering and reflection into consideration. Fresnel reflection is not subtracted out of the transmission and transmittance values reported herein. In addition, any total transmittance values referenced over a particular wavelength range are given as an average of the total transmittance values measured over the specified wavelength range. Further, as also used herein, "average absorbance" is given as (2−log(average transmittance, %))/path length.

Compressive stress (including surface compressive stress) is measured using a refracted near-field (RNF) technique. Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) may be measured with the RNF technique or a scattered light polariscope (SCALP) technique known in the art. The maximum central tension (CT) values are measured using a scattered light polariscope (SCALP) technique known in the art.

Concentration profiles of various constituent components in the glass, such as alkali constituent components, were measured by electron probe microanalysis (EPMA). EPMA may be utilized, for example, to discern compressive stress in the glass due to the ion exchange of alkali ions into the glass from compressive stress due to lamination.

The phrase "depth of compression" and "DOC" refer to the position in the glass where compressive stress transitions to tensile stress.

The terms "glass" and "glass composition" encompass both glass materials and glass-ceramic materials, as both classes of materials are commonly understood. Likewise, the term "glass structure" encompasses structures comprising glass. The term "reconstituted wafer- and/or panel-level package" encompasses any size of reconstituted substrate package including wafer level packages and panel level packages.

The term "formed from" can mean one or more of comprises, consists essentially of, or consists of. For example, a component that is formed from a particular material can comprise the particular material, consist essentially of the particular material, or consist of the particular material.

Directional terms as used herein—for example up, down, right, left, front, back, top, bottom, vertical, horizontal—are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items. Moreover, terms used in the specification and claims such as have, having, include, and including should be construed to be synonymous with the terms comprise and comprising.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

The drawings shall be interpreted as illustrating one or more embodiments that are drawn to scale and/or one or more embodiments that are not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that can be formed by such values.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

In the semiconductor industry, different manufacturers have overarching carrier substrate requirements (i.e., size, shape, etc.) that are somewhat uniform. However, the property specifications (i.e., coefficient of thermal expansion, elastic modulus, and the like) may differ from manufacturer to manufacturer or even from facility to facility. For example, the thermal profile of a semiconductor packaging process may be unique to a specific manufacturer which, in turn, gives rise to a need for carrier substrates having thermal characteristics tailored to the specific thermal profile, such as the coefficient of thermal expansion (CTE) or the like. In addition to particular CTE requirements, the glass carriers may also need to have certain other properties, such as elastic moduli, viscosity, surface quality, and edge strength requirements to be considered suitable for use in conjunction with particular semiconductor packaging operations. The wide array of property specifications for carrier substrates presents a unique challenge to manufacturers of glass substrates seeking to economically and efficiently mass produce carrier substrates compatible for use with different packaging operations.

Methods described herein facilitate forming carrier substrates having compositions that are compatible with the processes employed by various manufacturers, while allowing the properties of the carrier substrates, including the CTE, to be tuned to meet the specifications of individual manufacturers. Specifically, some embodiments described herein relate to methods for manufacturing a glass article having a target effective $CTE_{Teff}$ which can be achieved by making changes to a ratio of a thickness of the glass core layer to a total thickness of glass cladding layers in a glass laminate. Without being bound by theory, the effective $CTE_{eff}$ of a glass laminate varies with the ratio of the thickness of the glass core layer to a total thickness of glass cladding layers, and, as such, adjusting the ratio can be an effective driver to change the CTE of a resultant glass laminate, as will be described in greater detail below.

Referring now to FIG. 1, a cross-sectional schematic view of some embodiments of a glass substrate 100 is provided. Glass substrate 100 includes a glass core layer 110 coupled to a first or upper glass cladding layer 105 and a second or lower glass cladding layer 107. The glass substrate 100 includes multiple glass layers and can be considered a glass laminate. In some embodiments, the layers 105, 107, 110 are fused together without any adhesives, polymer layers, coating layers or the like positioned between them. In other embodiments, the layers 105, 107, 110 are coupled (e.g., adhered) together using adhesives or the like.

Glass substrate 100 can have any suitable composition and be made using any suitable method. Examples of suitable glass compositions can include alkaline-earth aluminoborosilicate glasses, zinc borosilicate glasses, and soda-lime glass as well as glass ceramics, such as those enriched with magnesium oxide, yttria, alumina, or zirconia. In general, glass substrate 100 and any of the layers 105, 107, 110 in the glass substrate can have any of the compositions or be made using any of the methods disclosed in U.S. Pat. No. 9,340,451 entitled "Machining of Fusion-Drawn Glass Laminate Structures Containing a Photomachinable Layer," issued May 17, 2016, and U.S. Patent Application Publication No. 2017/0073266 entitled "Glass Article and Method for Forming the Same," published Mar. 16, 2017, each of which is hereby incorporated by reference in its entirety.

In some embodiments, the glass substrate 100 is configured so that at least one of the glass cladding layers 105, 107 and the glass core layer 110 have different physical dimensions and/or physical properties that allow for selective removal of the at least one glass cladding layer 105, 107 relative to the glass core layer 110 to form precisely dimensioned cavities (not shown), which can be sized and shaped to receive microelectronic components.

In various embodiments, the glass substrate 100 is configured so that at least one of the glass cladding layers 105, 107 and the glass core layer 110 have different coefficients of thermal expansion (CTE). According to various embodiments described herein, at least one of the glass cladding layers 105, 107 is formed from a glass clad composition and has an average clad coefficient of thermal expansion $CTE_{clad}$ that is less than an average core coefficient of thermal expansion $CTE_{core}$. In such embodiments, a nearly uniform compressive stress forms across the thickness of the glass cladding layers 105, 107, with a balancing tensile stress within the glass core layer 110. Such glass laminates are mechanically strengthened, and can endure damages, such as damages that may occur during handling, better than non-strengthened glass articles, as will be described in greater detail below.

In various embodiments, the glass cladding layers 105, 107 each have a residual compressive stress of greater than 80 MPa. For example, each of the glass cladding layers 105, 107 may have a compressive stress of greater than 80 MPa, greater than 85 MPa, greater than 90 MPa, or greater than 95 MPa. In some embodiments, each of the glass cladding layers 105, 107 may have a compressive stress of less than 120 MPa, less than 115 MPa, less than 110 MPa, less than 105 MPa, less than 100 MPa, or less than 95 MPa. In some particular embodiments, the glass cladding layers each have a compressive stress of greater than 80 MPa and less than 110 MPa.

As described above, when the $CTE_{core}$ is greater than the $CTE_{clad}$, the glass core layer is under a tensile stress. In various embodiments, the glass core layer has a tensile stress of greater than 10 MPa and less than 45 MPa. In some embodiments, the glass core layer has a tensile stress of greater than 10 MPa, greater than 12 MPa, greater than 15 MPa, greater than 20 MPa, greater than 25 MPa, greater than 30 MPa, or greater than 35 MPa. In some embodiments, the glass core layer has a tensile stress of less than 45 MPa, less than 40 MPa, less than 35 MPa, or less than 30 MPa.

In embodiments, the residual stress in each of the layers of the glass substrate can be calculated according to the following equations:

$$\sigma_{clad} = -\frac{E_{clad}}{(1-v_{clad}) + \frac{E_{clad}(1-v_{core})}{E_{core}R}}(\alpha_{core} - \alpha_{clad})(T_{lamination} - T_{room});$$

$$\sigma_{core} = \frac{E_{core}}{(1-v_{core}) + \frac{E_{core}R(1-v_{clad})}{E_{clad}}}(\alpha_{core} - \alpha_{clad})(T_{lamination} - T_{room});$$

$$R = \frac{t_{core}}{2t_{clad}} = -\frac{\sigma_{clad}}{\sigma_{core}}$$

where σ is the stress, α is the CTE, E is the Young's modulus, v is Poisson's ratio, t is the layer thickness, R is the total core/clad thickness ratio, and T is the temperature. The lamination temperature ($T_{lamination}$) is the strain point of the clad or the core, minus 5 degrees, whichever is lower.

Moreover, the difference in the $CTE_{core}$ and the $CTE_{clad}$ enables the effective $CTE_{eff}$ of the glass article to be tuned by adjusting the thickness of the glass cladding layers 105, 107 and/or the glass core layer 110. In particular, the effective $CTE_{eff}$ of a laminated glass article, such as glass substrate 100, can be calculated according to the following equation:

$$\alpha_{eff} = \frac{\frac{2t_{clad}E_{clad}}{1-v_{clad}}\alpha_{clad} + \frac{t_{core}E_{core}}{1-v_{core}}\alpha_{core}}{\frac{2t_{clad}E_{clad}}{1-v_{clad}} + \frac{t_{core}E_{core}}{1-v_{core}}} = \frac{\frac{E_{clad}}{1-v_{clad}}\alpha_{clad} + \frac{RE_{core}}{1-v_{core}}\alpha_{core}}{\frac{E_{clad}}{1-v_{clad}} + \frac{RE_{core}}{1-v_{core}}}$$

where α is the CTE, E is Young's modulus, v is Poisson's ratio, t is the thickness of the layer, and R is the total core/clad thickness ratio.

In embodiments in which the Young's modulus and the Poisson's ratio of the glass cladding layer and the glass core layer are close (e.g., when the values of E/(1−v) for the glass core layer and the glass cladding layer are within 5%), the equation can be simplified as the following equation:

$$\alpha_{eff} \approx \frac{\alpha_{clad} + R\alpha_{core}}{(1+R)} = (1-\beta)\alpha_{clad} + \beta\alpha_{core}$$

where β is the core and total thickness ratio, or the core percentage.

Accordingly, in various embodiments, the thickness of the layers 105, 107, 110 can vary widely in the glass substrate 100. For example, the layers 105, 107, 110 can all have the same thickness or different thicknesses or two of the layers can be the same thickness while the third layer has a different thickness.

In some embodiments, one or both of the glass cladding layers 105, 107 are each 5 microns to 300 microns thick, 10 microns to 275 microns thick, or 12 microns to 250 microns thick. In other embodiments, one or both of the glass cladding layers 105, 107 are each greater than 5 microns thick, greater than 10 microns thick, greater than 12 microns thick, greater than 15 microns thick, greater than 20 microns thick, greater than 25 microns thick, greater than 30 microns thick, greater than 40 microns thick, greater than 50 microns thick, greater than 60 microns thick, greater than 70 microns thick, greater than 80 microns thick, greater than 90 microns thick, greater than 100 microns thick, greater than 125 microns thick, greater than 150 microns thick, greater than 175 microns thick, or greater than 200 microns thick. In other embodiments, one or both of the glass cladding layers 105, 107 are each less than 300 microns thick, less than 275 microns thick, less than 250 microns thick, less than 225 microns thick, less than 200 microns thick, less than 175 microns thick, less than 150 microns thick, less than 125 microns thick, or less than 100 microns thick. It should be appreciated, however, that the glass cladding layers 105, 107 can have other thicknesses.

According to some embodiments described herein, the thickness of each of the glass cladding layers 105, 107 is such that the compressive stress in the glass cladding layer extends to a depth of compression (DOC) of 60 μm or greater. For example, in some embodiments, the glass substrate has a DOC of greater than 60 μm, greater than 75 μm, greater than 80 μm, greater than 85 μm, greater than 90 μm, greater than 95 µm, greater than 100 µm, greater than 105 µm, greater than 110 µm, greater than 115 µm, or even greater than 120 µm. In some such embodiments, the minimum DOC is selected to ensure that the glass substrate has a suitable strength even after the glass substrate is subjected to possible damage during the fan-out process or in other uses.

In some embodiments, the glass core layer 110 has a thickness of from 300 microns to 1200 microns, or from 600 microns to 1100 microns. In other embodiments, the glass core layer 110 has a thickness of greater than 300 microns, greater than 500 microns, greater than 600 microns, greater than 700 microns, greater than 800 microns, greater than 900 microns. In other embodiments, the glass core layer 110 has a thickness of less than 1200 microns, less than 1100 microns, less than 1000 microns, less than 900 microns, or less than 800 microns. It should be appreciated, however, that the glass core layer 110 can have other thicknesses.

In various embodiments, a ratio of the thickness of the glass core layer to the total thickness of the glass cladding layers is greater than 1 and less than 50, or greater than 1.75 and less than 10. In some embodiments, the ratio is greater than 1, greater than 2, greater than 2.5, greater than 3, greater than 4, or greater than 5. In embodiments, the ratio is less than 50, less than 20, less than 10, less than 9, less than 8, less than 7, less than 6, less than 5, or less than 4. It should be appreciated, however, that glass substrate can have another ratio of the thickness of the glass core layer to the total thickness of the glass cladding layers.

In various embodiments described herein, a ratio of the thickness of the glass core layer to the total thickness of the glass cladding layers results in an effective $CTE_{eff}$ of the glass substrate 100 that is within ±0.5 ppm/°C., within ±0.2 ppm/°C., or even within ±0.1 ppm/°C. of a target effective $CTE_{Teff}$ for the glass substrate. The target effective $CTE_{Teff}$ may be determined, for example, based on received specifications, such as a specified target effective $CTE_{Teff}$, a specified tensile energy per area, a specified effective Young's modulus, or a specified stress in the glass cladding layers or the glass core layer. Thus, the target effective $CTE_{Teff}$ can be provided or can be calculated based on other specifications for the glass substrate, as described above and below.

In embodiments, the thickness of the glass cladding layers and the glass core layer may be selected, at least in part, based on a stored tensile energy of the glass substrate 100. In some embodiments, the thickness of the glass cladding layers and the glass core layer are selected such that the glass substrate 100 has a stored tensile energy per area of less than 20 J/m². For example, the glass substrate 100 may have a stored tensile energy per area of less than 20 J/m², less than 18 J/m², less than 15 J/m², less than 12 J/m², or less than 10 J/m². In some embodiments, the glass substrate 100 has a stored tensile energy per area of greater than 1.5 J/m², greater than 2 J/m², greater than 2.5 J/m², greater than 3 J/m², greater than 4 J/m², greater than 5 J/m², greater than 7 J/m², or greater than 10 J/m². In some embodiments, the glass substrate 100 has a stored tensile energy per area of less than 15 J/m² and greater than 2 J/m².

Another aspect of the glass substrate 100 that can vary widely is the glass composition of the layers 105, 107, 110. For example, the layers 105, 107, 110 can all have different glass compositions or two of the layers can have the same glass composition while the third layer has a different glass composition. In general, one or both of the glass cladding layers 105, 107 have a glass composition that is different than the glass composition of the glass core layer 110. This provides the glass substrate 100 with an effective $CTE_{eff}$ that can be tuned without changing the glass compositions used to form the glass cladding layers and the glass core layer, as described in various embodiments herein.

The glass compositions used to form the glass cladding layers 105, 107, and the glass core layer 110 may be any one of a number of suitable glass compositions. For example, the glass composition may be an alkali boroaluminosilicate glass composition, an alkaline earth boroaluminosilicate glass composition, a zinc boroaluminosilicate glass composition, or the like. The glass composition may be selected based on its CTE at a particular temperature or its average CTE over a temperature range (e.g., 0° C. to 400° C., 0° C. to 300° C., 0° C. to 260° C., 20° C. to 300° C., or 20° C. to 260° C.), its density, its Young's modulus, its 200 Poise temperature, or other properties that may be desired for processing or use of the glass article. The 200 Poise temperature is the minimum temperature at which the glass has a viscosity of 200 Poise, which is indicative of a minimum temperature of a well-melted glass.

In some embodiments, the glass compositions each have a liquidus viscosity suitable for forming the glass article 100 using a fusion draw process as described herein. For example, each of the glass compositions may have a liquidus viscosity of at least about 70 kP at least about 100 kP, at least about 200 kP, or at least about 300 kP. Additionally or alternatively, each of the glass compositions comprises a liquidus viscosity of less than about 3000 kP, less than about 2500 kP, less than about 1000 kP, or less than about 800 kP.

The glass compositions may generally include a combination of $SiO_2$, $Al_2O_3$, at least one alkaline earth oxides such as BeO, MgO, CaO, SrO and BaO, and/or alkali oxides, such as $Li_2O$, $Na_2O$, $K_2O$, $Rb_2O$ and $Cs_2O$. In some embodiments, the glass compositions are alkali-free, while in other embodiments, the glass compositions include one or more alkali oxides. In some embodiments, the glass compositions may further include minor amounts of one or more additional oxides, such as, by way of example and not limitation, $SnO_2$, $Sb_2O_3$, $ZrO_2$, ZnO, or the like. These components may be added as fining agents and/or to further modify the CTE of the glass composition.

In embodiments, the glass composition generally includes $SiO_2$ in an amount greater than or equal to 35 wt % and less than or equal to 80 wt %. When the content of $SiO_2$ is too small, the glass may have poor chemical and mechanical durability. On the other hand, when the content of $SiO_2$ is too large, melting ability of the glass decreases and the viscosity increases, so forming of the glass becomes difficult. In some embodiments, $SiO_2$ is present in the glass composition in an amount greater than or equal to 60 wt % and less than or equal to 80 wt %, greater than or equal to 70 wt % and less than or equal to 80 wt %, or greater than or equal to 35 wt % and less than or equal to 70 wt %.

The glass compositions may also include $Al_2O_3$. $Al_2O_3$, in conjunction with alkali oxides present in the glass composition, such as $Na_2O$ or the like, improves the susceptibility of the glass to ion exchange strengthening. Moreover, increased amounts of $Al_2O_3$ may also increase the softening point of the glass, thereby reducing the formability of the glass. The glass compositions described herein may include $Al_2O_3$ in an amount greater than or equal to 1.5 wt % and less than or equal to 27 wt %, greater than or equal to 1.5 wt % and less than or equal to 12 wt %, greater than or equal to 8 wt % and less than or equal to 15 wt %, greater than or equal to 10 wt % and less than or equal to 15 wt %, greater than or equal to 9.5 wt % and less than or equal to 12 wt %, greater than or equal to 17 wt % and less than or equal to 20 wt %, or greater than or equal to 22 wt % and less than or equal to 27 wt %.

In some embodiments described herein, the boron concentration in the glass compositions from which the glass articles are formed is a flux which may be added to glass compositions to make the viscosity-temperature curve less steep as well as lowering the entire curve, thereby improving the formability of the glass and softening the glass. In embodiments, the glass compositions include greater than or equal to 0 wt % $B_2O_3$ and less than or equal to 18 wt % $B_2O_3$, greater than or equal to 1 wt % and less than or equal to 15 wt % $B_2O_3$, greater than or equal to 2 wt % and less than or equal to 14 wt % $B_2O_3$, greater than or equal to 2 wt % and less than or equal to 5 wt % $B_2O_3$, or greater than or equal to 10 wt % and less than or equal to 18 wt % $B_2O_3$. In some embodiments, the glass compositions may be free from boron and compounds containing boron.

Embodiments of the glass compositions may further include one or more alkali oxides (e.g., $Na_2O$, $K_2O$, $Li_2O$, or the like). The alkali oxides facilitate the melting of the glass composition, lower the 200 Poise temperature, and lower the softening point of the glass, thereby offsetting the increase in the softening point due to higher concentrations of $SiO_2$ and/or $Al_2O_3$ in the glass composition. The alkali oxides also assist in improving the chemical durability of the glass composition and tuning the CTE to a desired value. The alkali oxides are generally present in the glass composition in an amount greater than or equal to 0 wt % and less than or equal to 14 wt %. In some embodiments, the amount of alkali oxides may be greater than or equal to 0 wt % and less than or equal to 14 wt %, greater than or equal to 6 wt % and less than or equal to 13 wt %, greater than or equal to 8 wt % and less than or equal to 12 wt %, greater than or equal to 9 wt % and less than or equal to 11 wt %, or greater than or equal to 1 wt % and less than or equal to 8 wt %. In all of the glass compositions described herein, the alkali oxides include at least $Na_2O$ and $K_2O$. Some embodiments the alkali oxides further include $Li_2O$.

In various embodiments, the inclusion of one or more alkali oxides in the glass compositions can enable the glass compositions to be ion exchanged according to methods known and used in the art. Ion exchanging the glass substrate may further strengthen the glass substrate and alter the stresses in the glass cladding layers and the glass core layer. However, in some embodiments, the glass substrate 100 is not ion exchanged, since ion exchange may result in dimensional changes or warpage of the glass substrate.

In order to achieve the desired CTE, embodiments of the glass compositions include $Na_2O$ in an amount greater than or equal to 0 wt % and less than or equal to 18 wt %, greater than 0 wt % and less than or equal to 18 wt %, greater than or equal to 1 wt % and less than or equal to 18 wt %, greater than or equal to 6 wt % and less than or equal to 18 wt %, greater than or equal to 0 wt % and less than or equal to 8 wt %, greater than or equal to 0 wt % and less than or equal to 5 wt %, or greater than or equal to 1 wt % and less than or equal to 8 wt %.

The concentration of $K_2O$ in the glass also influences the CTE of the glass composition. Accordingly, in some embodiments, the amount of $K_2O$ is greater than or equal to 0 wt % and less than or equal to 14 wt %, greater than or equal to 0 wt % and less than or equal to 10 wt %, or greater than or equal to 0 wt % and less than or equal to 7 wt %, greater than 0 wt % and less than or equal to 14 wt %, greater than 0 wt % and less than or equal to 10 wt %, or greater than 0 wt % and less than or equal to 7 wt %. In some embodiments, the glass composition may be substantially free of $K_2O$.

In embodiments of the glass composition that include $Li_2O$, the $Li_2O$ may be present in an amount greater than or equal to 0 wt % and less than or equal to 7.5 wt %, greater than or equal to 2 wt % and less than or equal to 5 wt %, or greater than or equal to 3 wt % and less than or equal to 7.5 wt %. However, in some embodiments, the glass composition may be substantially free of lithium and compounds containing lithium.

As provided hereinabove, embodiments of the glass compositions may further include one or more alkaline earth oxides. The alkaline earth oxide may include, for example, MgO, CaO, SrO, BaO, or combinations thereof. Alkaline earth oxides improve the meltability of the glass batch oxides and increase the chemical durability of the glass composition, in addition to influencing the CTE. In the glass compositions described herein, the glass compositions generally include at least one alkaline earth oxide in an amount greater than or equal to 1 wt % and less than or equal to 22 wt %, greater than or equal to 2 wt % and less than or equal to 12 wt %, greater than or equal to 1 wt % and less than or equal to 6 wt %, greater than or equal to 9 wt % and less than or equal to 22 wt %, greater than or equal to 12.5 wt % and less than or equal to 21 wt %, greater than or equal to 7 wt % and less than or equal to 20 wt %, greater than 0 wt % and less than or equal to 12.5 wt %, or greater than 0 wt % and less than or equal to 10 wt %.

MgO may be present in an amount from greater than or equal to 0 wt % to less than or equal to 12 wt %, greater than or equal to 1 wt % and less than or equal to 10 wt %, greater than or equal to 2 wt % and less than or equal to 10 wt %, greater than or equal to 1 wt % and less than or equal to 3 wt %, greater than or equal to 9 wt % and less than or equal to 12 wt %, greater than 0 wt % and less than or equal to 8 wt %, or even greater than 0 wt % and less than or equal to 4 wt %. However, it is contemplated that in some embodiments, MgO may not be included in the glass composition.

As another example, CaO may be present in the glass composition in an amount from greater than or equal to 0 wt % to less than or equal to 12 wt %. In embodiments, CaO may be present in an amount of from greater than 0 wt % to less than or equal to 8.5 wt %, greater than 0 wt % to less than or equal to 8 wt %, greater than 0 wt % to less than or equal to 3 wt %, greater than 0 wt % to less than or equal to 2 wt %, greater than or equal to 3 wt % to less than or equal to 6 wt %, greater than or equal to 7 wt % to less than or equal to 12 wt %, or greater than or equal to 8 wt % to less than or equal to 12 wt %. In some embodiments, CaO may be not be present in the glass composition.

In some embodiments, SrO may be included in the glass composition in an amount greater than 0.5 wt % and less than or equal to 3 wt %. In some embodiments, SrO may not be present in the glass composition.

In embodiments including BaO, the BaO may be present in an amount greater than about 0 wt % and less than about 3 wt %. In some of these embodiments, BaO may be present in the glass composition in an amount less than or equal to about 2 wt % or even less than or equal to about 1 wt %.

In addition to the $SiO_2$, $Al_2O_3$, alkali oxides and alkaline earth oxides, a first embodiment of exemplary base glass compositions may optionally include one or more fining agents, such as, by way of example and not limitation, $SnO_2$, $Sb_2O_3$, $As_2O_3$, and/or halogens such as $F^-$, and/or $Cl^-$ (from NaCl or the like). When a fining agent is present in the glass composition, the fining agent may be present in amount less than or equal to 1 wt % or even less than or equal to 0.5 wt %. When the content of the fining agent is too large, the fining agent may enter the glass structure and affect various glass properties. However, when the content of the fining agent is too low, the glass may be difficult to form. For example, in some embodiments, $SnO_2$ is included as a fining agent in an amount greater than or equal to 0.25 wt % to less than or equal to 0.50 wt %.

Other metal oxides may additionally be included in the glass compositions of some embodiments. For example, the glass composition may further include ZnO or $ZrO_2$, each of which improves the resistance of the glass composition to chemical attack. In such embodiments, the additional metal oxide may be present in an amount which is greater than or equal to 0 wt % and less than or equal to 6 wt %. For example, the glass composition may include $ZrO_2$ in an amount less than or equal to 6 wt %. If the content of $ZrO_2$ is too high, it may not dissolve in the glass composition, may result in defects in the glass composition, and may drive the Young's modulus up. In embodiments, ZnO may be included in an amount of less than or equal to 6 wt %, or less than or equal to 5 wt %. In some embodiments, ZnO may be included as a substitute for one or more of the alkaline earth oxides, such as a partial substitute for MgO in addition to or in place of at least one of CaO, BaO, or SrO. Accordingly, the content of ZnO in the glass composition can have the same effects as described above with respect to alkaline earth oxides if it is too high or too low.

In various embodiments, the glass composition may be substantially free of transition metals, such as iron and lanthanides such as cerium. Without being bound by theory, it is believed that by avoiding the use of such elements in the glass compositions, the optical transmission of the glass across near UV wavelengths can be increased. Accordingly, in some such embodiments, the glass substrate has an average optical transmission of greater than 60% over a range of wavelengths from 300 nm to 400 nm for a total substrate thickness of from 0.3 mm to 2 mm. The increased UV transmission can enable or improve the use of UV-debonding, such as the use of UV-debonding layers positioned between a glass carrier and semiconductor chip components. Moreover, in some embodiments, the purity of the raw materials used in the glass compositions may be controlled to enable an optical transmission of 20% or greater at wavelengths of less than 300 nm, or from 250 nm to 300 nm for a total substrate thickness of from 0.3 mm to 2 mm.

In various embodiments, the glass compositions selected for the glass core layer 110 and the glass cladding layers 105, 107 are selected such that each of the glass cladding layers 105, 107 and the glass core layer 110 has a Young's modulus of greater than 50 GPa, which may minimize flexing of the glass during processing and prevent damage to devices attached to the glass, such as when the glass is used as a carrier substrate for electronic devices. In some embodiments, each layer has a Young's modulus of greater than 50 GPa, greater than 55 GPa, greater than 60 GPa, greater than 65 GPa, or greater than 70 GPa. In some embodiments, each layer has a Young's modulus of less than 100 GPa, less than 95 GPa, less than 90 GPa, less than 85 GPa, less than 80 GPa, or less than 75 GPa. In various embodiments, the glass compositions are selected for the glass core layer and the glass cladding layers such that the glass substrate 100 has an effective Young's modulus of greater than 50 GPa, greater than 55 GPa, greater than 60 GPa, greater than 65 GPa, or greater than 70 GPa. In some particular embodiments, the glass substrate 100 has an effective Young's modulus of from 65 GPa to 80 GPa, or from 70 GPa to 75 GPa. However, it is contemplated that desired properties, including the Young's modulus, may vary depending on the particular embodiment, end use, and processing requirements for the glass substrate.

In embodiments, each of the glass compositions has a 200 Poise (200 P) temperature of less than 1720° C., less than 1610° C., or less than 1500° C., which may enable the glass to be melted in a variety of processing facilities. For example, the glass composition may have a 200 P temperature of less than or equal to 1720° C., less than 1610° C., less than 1500° C. or less than or equal to 1450° C. In some embodiments, the glass composition has a 200 P temperature of greater than or equal to 1000° C. to 1720° C., greater than or equal to 1050° C. and less than or equal to 1610° C., greater than or equal to 1100° C. and less than or equal to 1500° C., greater than or equal to 1150° C. and less than or equal to 1500° C., greater than or equal to 1200° C. and less than or equal to 1500° C., greater than or equal to 1250° C. and less than or equal to 1500° C., greater than or equal to 1300° C. and less than or equal to 1500° C., greater than or equal to 1000° C. and less than or equal to 1450° C., greater than or equal to 1050° C. and less than or equal to 1450° C., greater than or equal to 1100° C. and less than or equal to 1450° C., greater than or equal to 1150° C. and less than or equal to 1450° C., greater than or equal to 1200° C. and less than or equal to 1450° C., greater than or equal to 1250° C. and less than or equal to 1450° C., or greater than or equal to 1300° C. and less than or equal to 1450° C.

Figure 2:
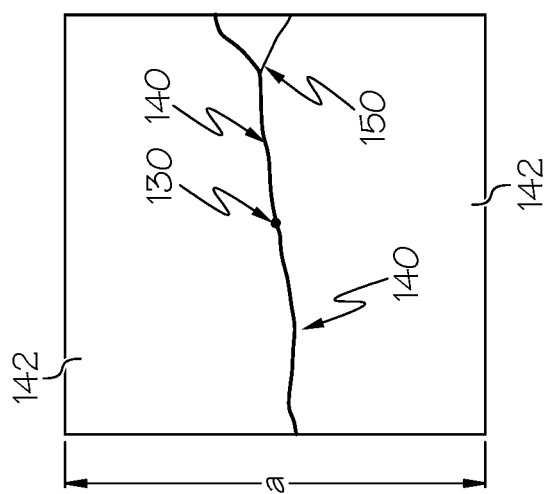
FIG. 2 is a representation of a non-frangible sample after a frangibility test.

In various embodiments, the glass substrate 100 is non-frangible. Frangible behavior refers to specific fracture behavior when a glass article is subjected to an impact or insult. As utilized herein, a glass is considered non-frangible when it exhibits at least one of the following in a test area as the result of a frangibility test: (1) four or less fragments with a largest dimension of at least 1 mm, and/or (2) the number of bifurcations is less than or equal to the number of crack branches. The fragments, bifurcations, and crack branches are counted based on any 2 inch by 2 inch square centered on the impact point. Thus a glass is considered non-frangible if it meets one or both of tests (1) and (2) for any 2 inch by 2 inch square centered on the impact point where the breakage is created according to the procedure described below. In a frangibility test, an impact probe is brought in to contact with the glass, with the depth to which the impact probe extends into the glass increasing in successive contact iterations. The step-wise increase in depth of the impact probe allows the flaw produced by the impact probe to reach the tension region while preventing the application of excessive external force that would prevent the accurate determination of the frangible behavior of the glass. In one embodiment, the depth of the impact probe in the glass may increase by about 5 µm in each iteration, with the impact probe being removed from contact with the glass between each iteration. The test area is any 2 inch by 2 inch square centered at the impact point. FIG. 2 depicts a non-frangible test result. As shown in FIG. 2, the test area is a square that is centered at the impact point 130, where the length of a side of the square a is 2 inches. The non-frangible sample shown in FIG. 2 includes three fragments 142, and two crack branches 140 and a single bifurcation 150. Thus, the non-frangible sample shown in FIG. 2 contains less than 4 fragments having a largest dimension of at least 1 mm and the number of bifurcations is less than or equal to the number of crack branches. As utilized herein, a crack branch originates at the impact point, and a fragment is considered to be within the test area if any part of the fragment extends into the test area. While coatings, adhesive layers, and the like may be used in conjunction with the strengthened glass articles described herein, such external restraints are not used in determining the frangibility or frangible behavior of the glass articles. In some embodiments, a film that does not impact the fracture behavior of the glass article may be applied to the glass article prior to the frangibility test to prevent the ejection of fragments from the glass article, increasing safety for the person performing the test.

Figure 3:
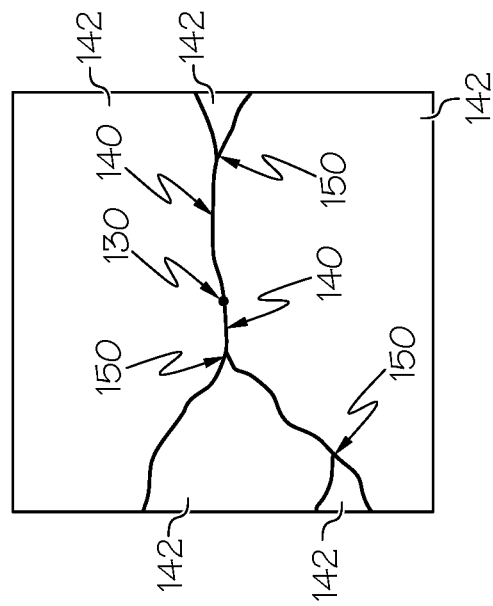
FIG. 3 is a representation of a frangible sample after a frangibility test.

A frangible sample is depicted in FIG. 3. The frangible sample includes 5 fragments 142 having a largest dimension of at least 1 mm. The sample depicted in FIG. 3 includes 2 crack branches 140 and 3 bifurcations 150, producing more bifurcations than crack branches. Thus, the sample depicted in FIG. 3 does not exhibit either four or less fragments or the number of bifurcations being less than or equal to the number of crack branches.

In the frangibility test described herein, the impact is delivered to the surface of the glass article with a force that is just sufficient to release the internally stored energy present within the strengthened glass article. That is, the point impact force is sufficient to create at least one new crack at the surface of the strengthened glass sheet and extend the crack through the compressive stress CS region (i.e., depth of compression) into the region that is under central tension CT.

Accordingly, the mechanically strengthened glasses described herein are "non-frangible"—i.e., they do not exhibit frangible behavior as described hereinabove when subjected to impact by a sharp object.

It should be appreciated that numerous changes can be made to the embodiments of the glass substrate 100 shown in FIG. 1. For example, in some embodiments, the glass substrate 100 can include only two glass layers 105, 110. In other embodiments, the glass substrate 100 can include four or more glass layers. Numerous other variations are also contemplated.

A variety of processes may be used to produce the glass substrates 100 described herein including, without limitation, lamination slot draw processes, lamination float processes, or fusion lamination processes. Each of these lamination processes generally involves flowing a first molten glass composition, flowing a second molten glass composition, and contacting the first molten glass composition with the second molten glass composition at a temperature greater than the glass transition temperature of either glass composition to form an interface between the two compositions such that the first and second molten glass compositions fuse together at the interface as the glass cools and solidifies.

Figure 4:
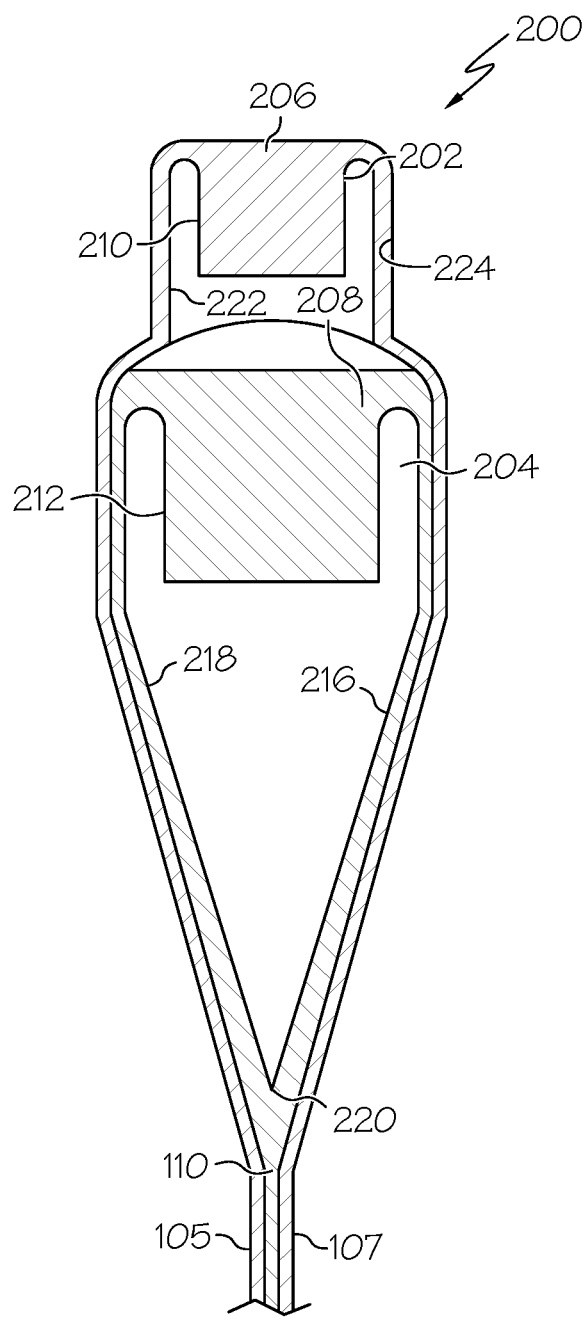
FIG. 4 schematically depicts an apparatus for forming a glass substrate according to one or more embodiments shown and described herein.

In one particular embodiment, the glass substrates 100 described herein may be formed by a fusion lamination process such as the process described in U.S. Pat. No. 4,214,886, which is incorporated herein by reference. Referring to FIG. 4 by way of example, a laminate fusion draw apparatus 200 for forming a laminated glass article includes an upper overflow distributor or isopipe 202 which is positioned over a lower overflow distributor or isopipe 204. The upper overflow distributor 202 includes a trough 210 into which a molten glass clad composition 206 is fed from a melter (not shown). Similarly, the lower overflow distributor 204 includes a trough 212 into which a molten glass core composition 208 is fed from a melter (not shown).

As the molten glass core composition 208 fills the trough 212, it overflows the trough 212 and flows over the outer forming surfaces 216, 218 of the lower overflow distributor 204. The outer forming surfaces 216, 218 of the lower overflow distributor 204 converge at a root 220. Accordingly, the molten glass core composition 208 flowing over the outer forming surfaces 216, 218 rejoins at the root 220 of the lower overflow distributor 204 thereby forming a glass core layer 110 of a glass substrate.

Simultaneously, the molten glass clad composition 206 overflows the trough 210 formed in the upper overflow distributor 202 and flows over outer forming surfaces 222, 224 of the upper overflow distributor 202. The molten glass clad composition 206 is outwardly deflected by the upper overflow distributor 202 such that the molten glass clad composition 206 flows around the lower overflow distributor 204 and contacts the molten glass core composition 208 flowing over the outer forming surfaces 216, 218 of the lower overflow distributor, fusing to the molten glass core composition and forming the glass cladding layers 105, 107 around the glass core layer 110.

The thickness of the glass core layer 110 and the glass cladding layers 105, 107, and therefore, the ratio of the thickness of the core layer to the total thickness of the glass cladding layers can be adjusted by controlling the flow of the molten glass core composition 208 and/or the molten glass clad composition 206 from the overflow distributors 202, 204, or other methods of controlling the thickness of a glass sheet as known to those skilled in the art. Alternatively, in some embodiments, the ratio of the thickness of the core layer to the total thickness of the glass cladding layers can be adjusted or controlled by etching or polishing.

While FIG. 4 schematically depicts a particular apparatus for forming planar laminated glass articles such as sheets or ribbons, it should be appreciated that other geometrical configurations are possible. For example, cylindrical laminated glass articles and glass canes may be formed, for example, using the apparatuses and methods described in U.S. Pat. No. 4,023,953.

In the embodiments described herein, the molten glass core composition 208 generally has an average core coefficient of thermal expansion $CTE_{core}$ which is greater than the average clad coefficient of thermal expansion $CTE_{clad}$ of the molten glass clad composition 206, as described herein above. Accordingly, as the glass core layer 110 and the glass cladding layers 105, 107 cool, the difference in the coefficients of thermal expansion of the glass core layer 110 and the glass cladding layers 105, 107 cause compressive stresses to develop in the glass cladding layers 105, 107. The compressive stress increases the strength of the resulting glass substrate 100. Accordingly, the glass substrates 100 described herein are mechanically strengthened through the lamination process.

In various embodiments, a glass article having a target effective $CTE_{Teff}$ averaged over a temperature range is manufactured by selecting a glass core composition having an average core glass coefficient of thermal expansion $CTE_{core}$ over the temperature range that is greater than the target effective $CTE_{Teff}$ and a glass clad composition having an average clad glass coefficient of thermal expansion $CTE_{clad}$ over the temperature range that is less than the target effective $CTE_{Teff}$. As described hereinabove, the particular compositions selected for both the glass core composition and the glass clad composition may be selected based on other properties of the glass compositions, including, but not limited to, the Young's modulus, 200 P temperature, and the like.

After the glass compositions are selected, the glass laminate is manufactured, such as by using the laminate fusion draw apparatus 200 shown and described in FIG. 4. The parameters of the glass laminate formation (e.g., the molten glass composition flow rate and the like) are selected such that a ratio of a thickness of the glass core layer to a total thickness of the two or more glass cladding layers is selected to produce the glass laminate having an effective coefficient of thermal expansion $CTE_{eff}$ over the temperature range that is within ±0.5 ppm/° C. of the target effective $CTE_{Teff}$. In some embodiments, the parameters may be tuned to adjust the resultant ratio of the glass laminate during the manufacturing process.

In various embodiments, a glass article having a target effective $CTE_{Teff}$ averaged over a temperature range is manufactured by manufacturing an initial glass laminate comprising a glass core layer formed from a glass core composition and two or more glass cladding layers formed from a glass clad composition. The initial glass laminate has a first ratio of a thickness of the glass core layer to a total thickness of the two or more glass cladding layers. The glass core composition has an average core glass coefficient of thermal expansion $CTE_{core}$ over the temperature range, the glass clad composition has an average clad glass coefficient of thermal expansion $CTE_{clad}$ over the temperature range, and the initial glass laminate has an initial effective coefficient of thermal expansion $CTE_{Ieff}$.

Next, a target effective $CTE_{Teff}$ is determined. The target effective $CTE_{Teff}$ may be determined, for example, by receiving a customer specification, or by calculating a target effective $CTE_{Teff}$ based on other properties desired in the glass article, such as an effective Young's modulus or residual stress value. In various embodiments, the target effective $CTE_{Teff}$ is within ±1 ppm/° C. of the initial effective $CTE_{Ieff}$. In some embodiments, the target effective $CTE_{Teff}$ is greater than or equal to 3 ppm/° C. and less than or equal to 12 ppm/° C., although other values for $CTE_{Teff}$ are contemplated.

Finally, the modified glass laminate, or the glass substrate, is manufactured, such as by using the laminate fusion draw apparatus 200 shown and described in FIG. 4. The parameters of the glass laminate formation (e.g., the molten glass composition flow rate and the like) are selected such that a ratio of a modified thickness of the modified glass core layer to a modified total thickness of the two or more modified glass cladding layers is selected to produce the modified glass laminate having an effective coefficient of thermal expansion $CTE_{eff}$ over the temperature range that is within ±0.5 ppm/° C. of the target effective $CTE_{Teff}$. In some embodiments, the parameters may be tuned to adjust the resultant ratio of the glass laminate during the manufacturing process. In some embodiments, the effective $CTE_{eff}$ is greater than or equal to 3 ppm/° C. and less than or equal to 12 ppm/° C., although other values for $CTE_{eff}$ are contemplated.

In some embodiments, the laminate fusion draw apparatus 200 may be equipped with Doctari and/or Lapinksy tubes to enable improved control over the heating and cooling of the molten glass compositions, leading to improved control of the thickness variation of the glass substrate 100. In some embodiments, laser control of temperature during the laminate fusion draw process can additionally enable improved control of the thickness variation of the glass substrate 100. Accordingly, in some embodiments, the glass substrate 100 has a total thickness variation (TTV) of less than 10 microns over a width of 450 mm or greater and less than or equal to 1500 mm, less than 5 microns over a width of 450 mm or greater and less than or equal to 1500 mm, less than 2 microns over a width of 450 mm or greater and less than or equal to 1500 mm, or even less than 1 micron over a width of 450 mm or greater and less than or equal to 1500 mm. For example, some embodiments have a TTV of less than 10 microns over a width of greater than 450 mm and less than or equal to 1500 mm, a TTV of less than 10 microns over a width of greater than 450 mm and less than or equal to 1000 mm, a TTV of less than 10 microns over a width of greater than 450 mm and less than or equal to 600 mm, a TTV of less than 2 microns over a width of 2000 mm, or even a TTV of less than 1 micron over a width of 2000 mm. It is contemplated, however, that other methods of controlling the thickness variation of the glass substrate 100 may be employed, including post-formation processing of the glass substrate 100.

Examples

In order that various embodiments be more readily understood, reference is made to the following examples, which are intended to illustrate various embodiments.

Example glass substrates were formed from a glass core composition, Composition A, and a glass clad composition, Composition B, set forth in Table 1, in terms of wt %. Various properties of layers formed from Compositions A and B are also set forth in Table 1. The average CTE values reported in Table 1 were measured using a dilatometer.

TABLE 1

|  | Composition A | Composition B |
| --- | --- | --- |
| $SiO_2$ | 64.20 | 75.85 |
| $B_2O_3$ | 4.30 | 13.60 |
| $Al_2O_3$ | 15.00 | 3.50 |
| $Na_2O$ | 9.83 | 4.00 |
| $K_2O$ | 0.00 | 1.10 |
| CaO | 2.44 | 1.00 |
| MgO | 1.22 | 0.72 |
| ZnO | 1.25 | 0.00 |
| SrO | 1.60 | 0.00 |
| $SnO_2$ | 0.16 | 0.23 |
| Total: | 100.00 | 100.00 |
| Density (g/cm³) | 2.45 | 2.26 |
| Average CTE (20° C.-300 ° C.) (ppm/° C.) | 6.85 | 4.30 |
| Softening Point (° C.) | 843.1 | 788.0 |
| Annealing Point (° C.) | 610.0 | 555.0 |
| Strain Point (° C.) | 565.0 | 511.0 |
| Young's Modulus (GPa) | 72.7 | 70.6 |
| Shear Modulus (GPa) | 30.0 | 29.1 |
| Poisson Ratio | 0.21 | 0.21 |

Properties were calculated based on glass substrates formed from Compositions A and B, each having a total thickness of 1.1 mm, but a varying core/clad thicknesses. In particular, the effective CTE ($CTE_{eff}$), effective Young's modulus ($E_{eff}$), compressive stress in the clad, tensile stress in the core, and tensile energy per area were calculated. The results are reported in Table 2.

TABLE 2

| Core % ratio | Core/clad thickness ratio | Core thickness (um) | One side clad thickness (um) | Effective CTE (ppm/deg C.) | Effective YM (GPa) | Compressive stress in Clad (MPa) | Tensile stress in Core (MPa) | Tensile energy per area (J/m^2) |
|---|---|---|---|---|---|---|---|---|
| 0.6 | 1.50 | 660 | 220.00 | 5.85 | 71.84 | 67.1 | 44.7 | 14.35 |
| 0.625 | 1.67 | 687.5 | 206.25 | 5.91 | 71.89 | 69.8 | 41.9 | 13.12 |
| 0.65 | 1.86 | 715 | 192.50 | 5.97 | 71.95 | 72.6 | 39.1 | 11.87 |
| 0.675 | 2.08 | 742.5 | 178.75 | 6.04 | 72.00 | 75.3 | 36.3 | 10.61 |
| 0.7 | 2.33 | 770 | 165.00 | 6.10 | 72.05 | 78.0 | 33.4 | 9.36 |
| 0.714 | 2.50 | 785.4 | 157.30 | 6.14 | 72.08 | 79.6 | 31.9 | 8.67 |
| 0.725 | 2.64 | 797.5 | 151.25 | 6.16 | 72.10 | 80.8 | 30.6 | 8.14 |
| 0.75 | 3.00 | 825 | 137.50 | 6.23 | 72.15 | 83.5 | 27.8 | 6.95 |
| 0.775 | 3.44 | 852.5 | 123.75 | 6.29 | 72.20 | 86.2 | 25.0 | 5.81 |
| 0.8 | 4.00 | 880 | 110.00 | 6.35 | 72.26 | 88.9 | 22.2 | 4.73 |
| 0.825 | 4.71 | 907.5 | 96.25 | 6.41 | 72.31 | 91.6 | 19.4 | 3.73 |
| 0.85 | 5.67 | 935 | 82.50 | 6.48 | 72.36 | 94.3 | 16.6 | 2.82 |
| 0.875 | 7.00 | 962.5 | 68.75 | 6.54 | 72.41 | 97.1 | 13.9 | 2.01 |
| 0.9 | 9.00 | 990 | 55.00 | 6.60 | 72.46 | 99.8 | 11.1 | 1.32 |
| 0.925 | 12.33 | 1017.5 | 41.25 | 6.66 | 72.51 | 102.5 | 8.3 | 0.76 |
| 0.95 | 19.00 | 1045 | 27.50 | 6.73 | 72.57 | 105.1 | 5.5 | 0.35 |

According to the data in Table 2, glass substrates having a core/clad thickness ratio between 1.8 and 7.0 can provide a glass substrate having a depth of compression (DOC) of greater than 60 μm and a compressive stress of greater than 80 MPa in the clad layer. Such glass substrates could be used to achieve an effective $CTE_{eff}$ of from 6.2 to 6.8 ppm/° C.

Next, a glass substrate having a total thickness of 0.7 mm and a thickness ratio (core/clad) of 3 was formed using the compositions provided in Table 1, and the transmittance of light having a wavelength from 200 to 800 was measured. The results are shown in FIG. 5.

Figure 5:
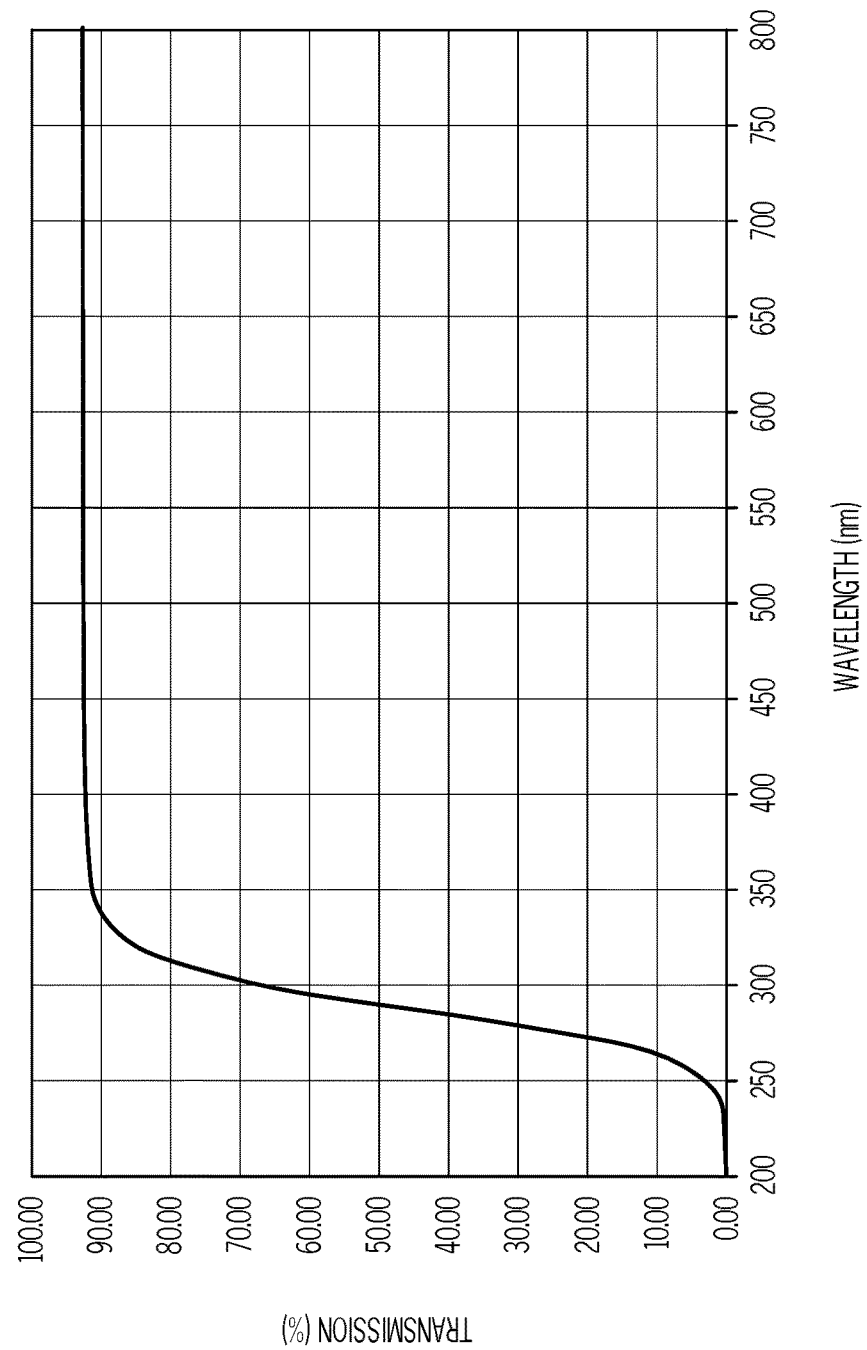
FIG. 5 is a graph of the transmission of light (in %; Y-axis) as a function of wavelength (in nm; X-axis) for an example glass substrate according to one or more embodiments shown and described herein.

As shown in FIG. 5, the glass substrate, which is free of transition elements such as iron, achieves a transmission of greater than 60% over the wavelengths from 300 nm to 400 nm, which is the range of wavelengths used by various UV-debonding technologies. Accordingly, the glass substrate is compatible with UV-debonding processes employed by various semiconductor manufacturers.

In various embodiments, a reconstituted wafer- and/or panel-level package is described as comprising a glass substrate comprising a plurality of cavities and a microelectronic component positioned in each one of the plurality of cavities in the glass substrate. It should be noted that such a reconstituted wafer- and/or panel-level package may have additional cavities with or without microelectronic components positioned therein. For example, in some embodiments, a reconstituted wafer- and/or panel-level package includes a plurality of cavities with a microelectronic component positioned in each one of the plurality of cavities and one or more additional cavities that are free of a microelectronic component positioned therein. In other embodiments, a reconstituted wafer- and/or panel-level package includes a plurality of cavities with a microelectronic component positioned in each one of the plurality of cavities and is free of additional cavities.

The subject matter recited in the claims is not coextensive with and should not be interpreted to be coextensive with any embodiment, feature, or combination of features described or illustrated in this document. This is true even if only a single embodiment of the feature or combination of features is illustrated and described in this document.

It will be apparent to those skilled in the art that various modifications and variations can be made without departing from the spirit or scope of the claimed subject matter.

Accordingly, the claimed subject matter is not to be restricted except in light of the attached claims and their equivalents.

What is claimed is:

1. A method for manufacturing a glass article having a target effective coefficient of thermal expansion $CTE_{Teff}$ averaged over a temperature range, the method comprising:
   selecting a glass core composition having an average core glass coefficient of thermal expansion $CTE_{core}$ over the temperature range that is greater than the target effective $CTE_{Teff}$ and a glass clad composition having an average clad glass coefficient of thermal expansion $CTE_{clad}$ over the temperature range that is less than the target effective $CTE_{Teff}$; and
   manufacturing a glass laminate comprising a glass core layer formed from the glass core composition and two or more glass cladding layers fused to the glass core layer, each of the two or more glass cladding layers formed from the glass clad composition such that a ratio of a thickness of the glass core layer to a total thickness of the two or more glass cladding layers is selected to produce the glass laminate having an effective coefficient of thermal expansion $CTE_{eff}$ over the temperature range that is within ±0.5 ppm/° C. of the target effective $CTE_{Teff}$;
   wherein the glass laminate has an optical transmission of at least 20% over a range of wavelengths from 250 nm to 400 nm for a total substrate thickness of from 0.3 mm to 2 mm.

2. The method of claim 1, wherein each of the glass core layer and the two or more glass cladding layers comprises a Young's modulus of greater than 50 GPa.

3. The method of claim 1, wherein the two or more glass cladding layers each have a residual compressive stress of greater than 80 MPa.

4. The method of claim 1, wherein the glass laminate has an optical transmission of greater than 60% over a range of wavelengths from 300 nm to 400 nm for a total substrate thickness of from 0.3 mm to 2 mm.

5. The method of claim 1, wherein the glass laminate has an optical transmission of greater than 20% over a range of wavelengths from 250 nm to 300 nm for a total substrate thickness of from 0.3 mm to 2 mm.

6. A method for manufacturing a glass article having a target effective coefficient of thermal expansion $CTE_{Teff}$ averaged over a temperature range, the method comprising:

selecting a glass core composition having an average core glass coefficient of thermal expansion $CTE_{core}$ over the temperature range that is greater than the target effective $CTE_{Teff}$ and a glass clad composition having an average clad glass coefficient of thermal expansion $CTE_{clad}$ over the temperature range that is less than the target effective $CTE_{Teff}$; and manufacturing a glass laminate comprising a glass core layer formed from the glass core composition and two or more glass cladding layers fused to the glass core layer, each of the two or more glass cladding layers formed from the glass clad composition such that a ratio of a thickness of the glass core layer to a total thickness of the two or more glass cladding layers is selected to produce the glass laminate having an effective coefficient of thermal expansion $CTE_{eff}$ over the temperature range that is within ±0.5 ppm/° C. of the target effective $CTE_{Teff}$;

wherein the glass laminate has a stored tensile energy per area of less than 20 J/m².

7. A method for manufacturing a glass article having a target effective coefficient of thermal expansion $CTE_{Teff}$ averaged over a temperature range, the method comprising:

manufacturing an initial glass laminate comprising a glass core layer formed from a glass core composition and two or more glass cladding layers fused to the glass core layer, each of the two or more glass cladding layers formed from a glass clad composition having a first ratio of a thickness of the glass core layer to a total thickness of the two or more glass cladding layers, wherein the glass core composition has an average core glass coefficient of thermal expansion $CTE_{core}$ over the temperature range, the glass clad composition has an average clad glass coefficient of thermal expansion $CTE_{clad}$ over the temperature range, and the initial glass laminate has an initial effective coefficient of thermal expansion $CTE_{Ieff}$;

determining the target effective coefficient of thermal expansion $CTE_{Teff}$ averaged over the temperature range, wherein the target effective $CTE_{Teff}$ is within #1 ppm/° C. of the initial effective $CTE_{Ieff}$; and manufacturing a modified glass laminate comprising a modified glass core layer formed from the glass core composition and two or more modified glass cladding layers fused to the modified glass core layer, each of the two or more modified glass cladding layers formed from the glass clad composition such that a ratio of a modified thickness of the modified glass core layer to a modified total thickness of the two or more modified glass cladding layers is selected to produce the modified glass laminate having an effective coefficient of thermal expansion $CTE_{eff}$ over the temperature range that is within ±0.5 ppm/° C. of the target effective $CTE_{Teff}$.

8. The method of claim 7, wherein each of the glass core layer and the two or more glass cladding layers in the initial glass laminate and each of the modified glass core layer and the two or more modified glass cladding layers in the modified glass laminate comprises a Young's modulus of greater than 50 GPa.

9. The method of claim 7, wherein the two or more glass cladding layers in the initial glass laminate and the two or more glass modified cladding layers in the modified glass laminate each have a residual compressive stress of greater than 80 MPa.

10. The method of claim 7, wherein the modified glass laminate has an optical transmission of greater than 60% over a range of wavelengths from 300 nm to 400 nm for a total substrate thickness of from 0.3 mm to 2 mm.

11. The method of claim 7, wherein the modified glass laminate has an optical transmission of greater than 20% over a range of wavelengths from 250 nm to 300 nm for a total substrate thickness of from 0.3 mm to 2 mm.

12. The method of claim 7, wherein the modified glass laminate has a stored tensile energy per area of less than 20 J/m².

13. The method of claim 7, wherein the initial effective $CTE_{Ieff}$ is greater than the target $CTE_{Teff}$ and the ratio of the modified thickness of the modified glass core layer to the modified total thickness of the two or more modified glass cladding layers is less than the first ratio.

14. The method of claim 7, wherein the initial effective $CTE_{Ieff}$ is less than the target $CTE_{Teff}$ and the ratio of the modified thickness of the modified glass core layer to the modified total thickness of the two or more modified glass cladding layers is greater than the first ratio.

* * * * *